United States Patent
Nishimoto

(10) Patent No.: US 10,315,727 B2
(45) Date of Patent: Jun. 11, 2019

(54) BICYCLE REAR SPROCKET ASSEMBLY

(71) Applicant: Shimano Inc., Sakai, Osaka (JP)

(72) Inventor: Naohiro Nishimoto, Osaka (JP)

(73) Assignee: Shimano Inc., Osaka (JP)

( * ) Notice: Subject to any disclaimer, the term of this patent is extended or adjusted under 35 U.S.C. 154(b) by 247 days.

(21) Appl. No.: 15/434,542

(22) Filed: Feb. 16, 2017

(65) Prior Publication Data
US 2018/0229801 A1    Aug. 16, 2018

(51) Int. Cl.
*B62M 9/10* (2006.01)
*F16H 55/30* (2006.01)

(52) U.S. Cl.
CPC .............. *B62M 9/10* (2013.01); *F16H 55/30* (2013.01)

(58) Field of Classification Search
CPC ................................. B62M 9/10; F16H 55/30
See application file for complete search history.

(56) References Cited

U.S. PATENT DOCUMENTS

| | | | |
|---|---|---|---|
| 4,102,215 A * | 7/1978 | Nagano | B62M 9/10 192/64 |
| 4,127,038 A * | 11/1978 | Browning | B62M 9/10 280/236 |
| 5,816,377 A * | 10/1998 | Nakamura | B62M 9/10 192/64 |
| 6,264,575 B1 | 7/2001 | Lim et al. | |
| 2003/0064844 A1 | 4/2003 | Lin | |
| 2008/0058144 A1 * | 3/2008 | Oseto | B62M 9/10 474/160 |
| 2009/0243250 A1 | 10/2009 | Chiang | |
| 2013/0017914 A1 * | 1/2013 | Braedt | B62M 9/10 474/160 |
| 2017/0057598 A1 * | 3/2017 | Thrash | B62M 9/10 |

* cited by examiner

*Primary Examiner* — Michael R Mansen
*Assistant Examiner* — Robert T Resse
(74) *Attorney, Agent, or Firm* — Global IP Counselors, LLP

(57) ABSTRACT

A bicycle rear sprocket assembly is basically provided that includes a first sprocket assembly and a second sprocket assembly. The first sprocket assembly includes at least one first sprocket and a first torque transmitting profile. The second sprocket assembly includes at least one second sprocket and a second torque transmitting profile. The second torque transmitting profile is configured to engage the first torque transmitting profile to transmit torque between the first sprocket assembly and the second sprocket assembly. A threaded portion is provided to one of the first sprocket assembly and the second sprocket assembly. The threaded portion is configured to threadedly engage a bicycle rear hub assembly.

19 Claims, 12 Drawing Sheets

# BICYCLE REAR SPROCKET ASSEMBLY

BACKGROUND

Field of the Invention

This invention generally relates to a bicycle rear sprocket assembly.

Background Information

Bicycling is becoming an increasingly more popular form of recreation, as well as a means of transportation. Moreover, bicycling has become a very popular competitive sport for both amateurs and professionals. Whether the bicycle is used for recreation, transportation or competition, the bicycle industry is constantly improving the various components of the bicycle. One area that has been extensively redesigned over the years is the bicycle drive train. Specifically, manufacturers of bicycle components have been continually improving shifting performance of the various shifting components, such as shifters, derailleurs, chain and sprockets.

One particular component of the bicycle drive train that has been extensively redesigned in the past years is the sprocket assembly.

SUMMARY

Generally, the present disclosure is directed to various features of a bicycle rear sprocket assembly.

In view of the state of the known technology and in accordance with a first aspect of the present disclosure, a bicycle rear sprocket assembly is basically provided that includes a first sprocket assembly and a second sprocket assembly. The first sprocket assembly includes at least one first sprocket and a first torque transmitting profile. The second sprocket assembly includes at least one second sprocket and a second torque transmitting profile. The second torque transmitting profile is configured to engage the first torque transmitting profile to transmit torque between the first sprocket assembly and the second sprocket assembly. A threaded portion is provided to one of the first sprocket assembly and the second sprocket assembly. The threaded portion is configured to threadedly engage a bicycle rear hub assembly. According to the first aspect of the present invention, a bicycle rear sprocket assembly is provided in which it is possible to mount a bicycle rear sprocket assembly to a bicycle rear hub assembly without forming splines.

In accordance with a second aspect of the present invention, the bicycle rear sprocket assembly according to the first aspect is configured so that the at least one first sprocket includes a plurality of first sprockets. According to the second aspect of the present invention, a bicycle rear sprocket assembly is provided in which it is possible to mount a bicycle rear sprocket assembly to a bicycle rear hub assembly without forming splines.

In accordance with a third aspect of the present invention, the bicycle rear sprocket assembly according to the first or second aspect is configured so that the at least one second sprocket includes a plurality of second sprockets. According to the third aspect of the present invention, a bicycle rear sprocket assembly is provided in which it is possible to mount a sprocket assembly including a plurality of sprockets to a bicycle rear hub assembly without forming splines.

In accordance with a fourth aspect of the present invention, the bicycle rear sprocket assembly according to any one of the first to third aspects is configured so that one of the first torque transmitting profile and the second torque transmitting profile includes at least one projection, the other of the first torque transmitting profile and the second torque transmitting profile includes at least one recess configured to receive the at least one projection. According to the fourth aspect of the present invention, a bicycle rear sprocket assembly is provided in which it is possible to effectively transmit torque between a first sprocket assembly and a second sprocket assembly.

In accordance with a fifth aspect of the present invention, the bicycle rear sprocket assembly according to the fourth aspect is configured so that the at least one projection extends in an axial direction parallel to a rotational center axis of the bicycle rear sprocket assembly, and the at least one recess extends in the axial direction. According to the fifth aspect of the present invention, a bicycle rear sprocket assembly is provided in which it is possible to downsize a bicycle rear sprocket assembly in a radial direction with respect to a rotational center axis of the bicycle rear sprocket assembly.

In accordance with a sixth aspect of the present invention, the bicycle rear sprocket assembly according to the fourth or fifth aspects is configured such that the at least one projection includes a plurality of projections and the at least one recess includes a plurality of recesses. According to the sixth aspect of the present invention, a bicycle rear sprocket assembly is provided in which it is possible to effectively transmit torque between a first sprocket assembly and a second sprocket assembly.

In accordance with a seventh aspect of the present invention, the bicycle rear sprocket assembly according to the sixth aspect is configured such that the plurality of projections are circumferentially spaced on the one of the first torque transmitting profile and the second torque transmitting profile, and the plurality of recesses are circumferentially spaced on the other of the first torque transmitting profile and the second torque transmitting profile. According to the seventh aspect of the present invention, a bicycle rear sprocket assembly is provided in which it is possible to effectively transmit torque between a first sprocket assembly and a second sprocket assembly.

In accordance with an eighth aspect of the present invention, the bicycle rear sprocket assembly according to any one of the first to seventh aspects is configured to include a connecting member configured to connect the first sprocket assembly and the second sprocket assembly. According to the eighth aspect of the present invention, a bicycle rear sprocket assembly is provided in which it is possible to unitize a first sprocket assembly and a second sprocket assembly.

In accordance with a ninth aspect of the present invention, the bicycle rear sprocket assembly according to the eighth aspect is configured so that the connecting member includes a tool engaging profile. According to the ninth aspect of the present invention, a bicycle rear sprocket assembly is provided in which it is possible to unitize a first sprocket assembly and a second sprocket assembly by using a tool.

In accordance with a tenth aspect of the present invention, the bicycle rear sprocket assembly according to the ninth aspect is configured so that the tool engaging profile is disposed on an inner surface of the connecting member. According to the tenth aspect of the present invention, a bicycle rear sprocket assembly is provided in which it is possible to downsize a bicycle rear sprocket assembly.

In accordance with an eleventh aspect of the present invention, the bicycle rear sprocket assembly according to any one of the eighth to tenth aspects is configured such that one of the first sprocket assembly and the second sprocket assembly has a first threaded part, and the connecting member includes a second threaded part configured to threadedly engage the first threaded part. According to the eleventh aspect of the present invention, a bicycle rear sprocket assembly is provided in which it is possible to effectively unitize a first sprocket assembly and a second sprocket assembly.

In accordance with a twelfth aspect of the present invention, the bicycle rear sprocket assembly according to the eleventh aspect is configured such that the second threaded part is disposed on an outer surface of the connecting member. According to the twelfth aspect of the present invention, a bicycle rear sprocket assembly is provided in which it is possible to downsize a bicycle rear sprocket assembly.

In accordance with a thirteenth aspect of the present invention, the bicycle rear sprocket assembly according to the eleventh or twelfth aspect is configured such that the other of the first sprocket assembly and the second sprocket assembly has a first axial abutment surface, and the connecting member includes a second axial abutment surface configured to contact the first axial abutment surface. According to the thirteenth aspect of the present invention, a bicycle rear sprocket assembly is provided in which it is possible to effectively unitize a first sprocket assembly and a second sprocket assembly.

In accordance with a fourteenth aspect of the present invention, the bicycle rear sprocket assembly according to any of the first to thirteenth aspects is configured such that the at least one first sprocket has a first sprocket diameter, and the at least one second sprocket has a second sprocket diameter that is smaller than the first sprocket diameter. According to the fourteenth aspect of the present invention, a bicycle rear sprocket assembly is provided in which it is possible to mount a bicycle rear sprocket assembly to a bicycle rear hub assembly without forming splines.

In accordance with a fifteenth aspect of the present invention, the bicycle rear sprocket assembly according to any of the first to fourteenth aspects is configured such that the threaded portion is provided to the first sprocket assembly. According to the fifteenth aspect of the present invention, a bicycle rear sprocket assembly is provided in which it is possible to mount a bicycle rear sprocket assembly to a bicycle rear hub assembly without forming splines.

In accordance with a sixteenth aspect of the present invention, the bicycle rear sprocket assembly according to any of the first to fourteenth aspects is configured such that the threaded portion is provided to the second sprocket assembly. According to the sixteenth aspect of the present invention, a bicycle rear sprocket assembly is provided in which it is possible to mount a bicycle rear sprocket assembly to a bicycle rear hub assembly without forming splines.

In accordance with a seventeenth aspect of the present invention, a bicycle rear sprocket assembly is provided that basically includes a first sprocket and a second sprocket. The first sprocket includes a first sprocket body, a plurality of first sprocket teeth provided to a first outer periphery of the first sprocket body, and a first torque transmitting profile. The second sprocket includes a second sprocket body, a plurality of second sprocket teeth provided to a second outer periphery of the second sprocket body, and a second torque transmitting profile. The second torque transmitting profile is configured to engage the first torque transmitting profile to transmit torque between the first sprocket and the second sprocket. A threaded portion is provided to one of the first sprocket body and the second sprocket body. According to the seventeenth aspect of the present invention, a bicycle rear sprocket assembly is provided in which it is possible to mount a bicycle rear sprocket assembly to a bicycle rear hub assembly without forming splines.

In accordance with an eighteenth aspect of the present invention, the bicycle rear sprocket assembly according to the seventeenth aspect is configured such that one of the first torque transmitting profile and the second torque transmitting profile includes at least one projection, and the other of the first torque transmitting profile and the second torque transmitting profile includes at least one recess configured to receive the at least one projection. According to the eighteenth aspect of the present invention, a bicycle rear sprocket assembly is provided in which it is possible to effectively transmit torque between a first sprocket and a second sprocket.

In accordance with a nineteenth aspect of the present invention, the bicycle rear sprocket assembly according to the eighteenth aspect is configured such that the at least one projection extends in an axial direction parallel to a rotational center axis of the bicycle rear sprocket assembly, and the at least one recess extends in the axial direction. According to the nineteenth aspect of the present invention, a bicycle rear sprocket assembly is provided in which it is possible to downsize a bicycle rear sprocket assembly in a radial direction with respect to a rotational center axis of the bicycle rear sprocket assembly.

In accordance with a twentieth aspect of the present invention, the bicycle rear sprocket assembly according to the eighteenth or nineteenth aspect is configured such that the at least one projection includes a plurality of projections, and the at least one recess includes a plurality of recesses. According to the twentieth aspect of the present invention, a bicycle rear sprocket assembly is provided in which it is possible to effectively transmit torque between a first sprocket and a second sprocket.

In accordance with a twenty-first aspect of the present invention, the bicycle rear sprocket assembly according to the twentieth aspect is configured such that the plurality of projections are circumferentially spaced on the one of the first torque transmitting profile and the second torque transmitting profile, and the plurality of recesses are circumferentially spaced on the other of the first torque transmitting profile and the second torque transmitting profile. According to the twenty-first aspect of the present invention, a bicycle rear sprocket assembly is provided in which it is possible to effectively transmit torque between a first sprocket and a second sprocket.

Also other objects, features, aspects and advantages of the disclosed bicycle rear sprocket assembly will become apparent to those skilled in the art from the following detailed description, which, taken in conjunction with the annexed drawings, discloses exemplary embodiments of the bicycle rear sprocket assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Because the various parts of a bicycle are well known in the bicycle art, these parts of the bicycle will not be discussed or illustrated in detail herein, except as they are modified in accordance with the exemplary embodiments of the present invention. It will be apparent to those skilled in the bicycle field from this disclosure that a bicycle rear sprocket assembly in accordance with the exemplary embodiments of the present invention can have a different number of sprockets.

Figure 1:
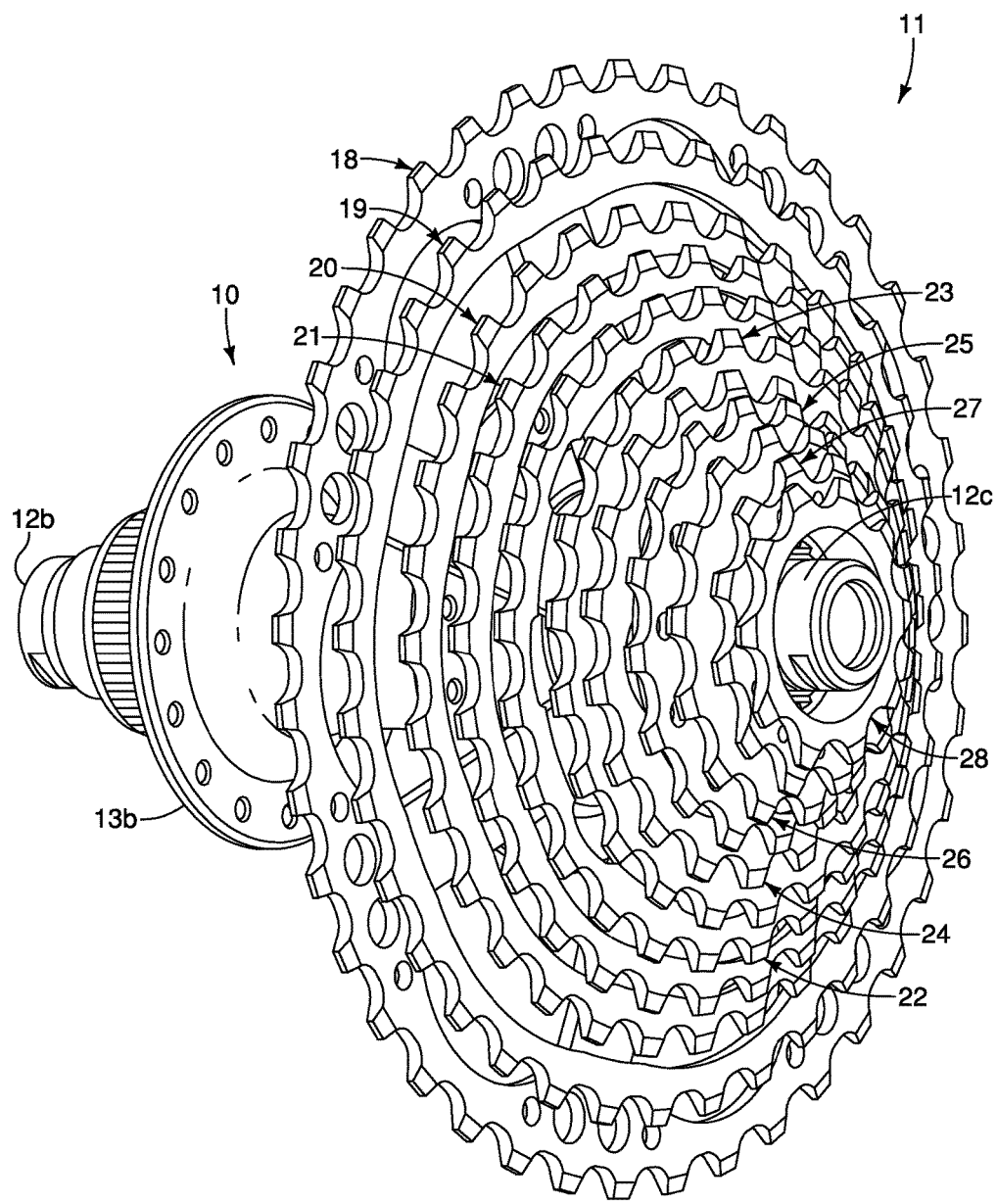
FIG. 1 is a perspective view of a bicycle rear sprocket assembly mounted to a bicycle rear hub assembly in accordance with one illustrated embodiment.
Figure 2:
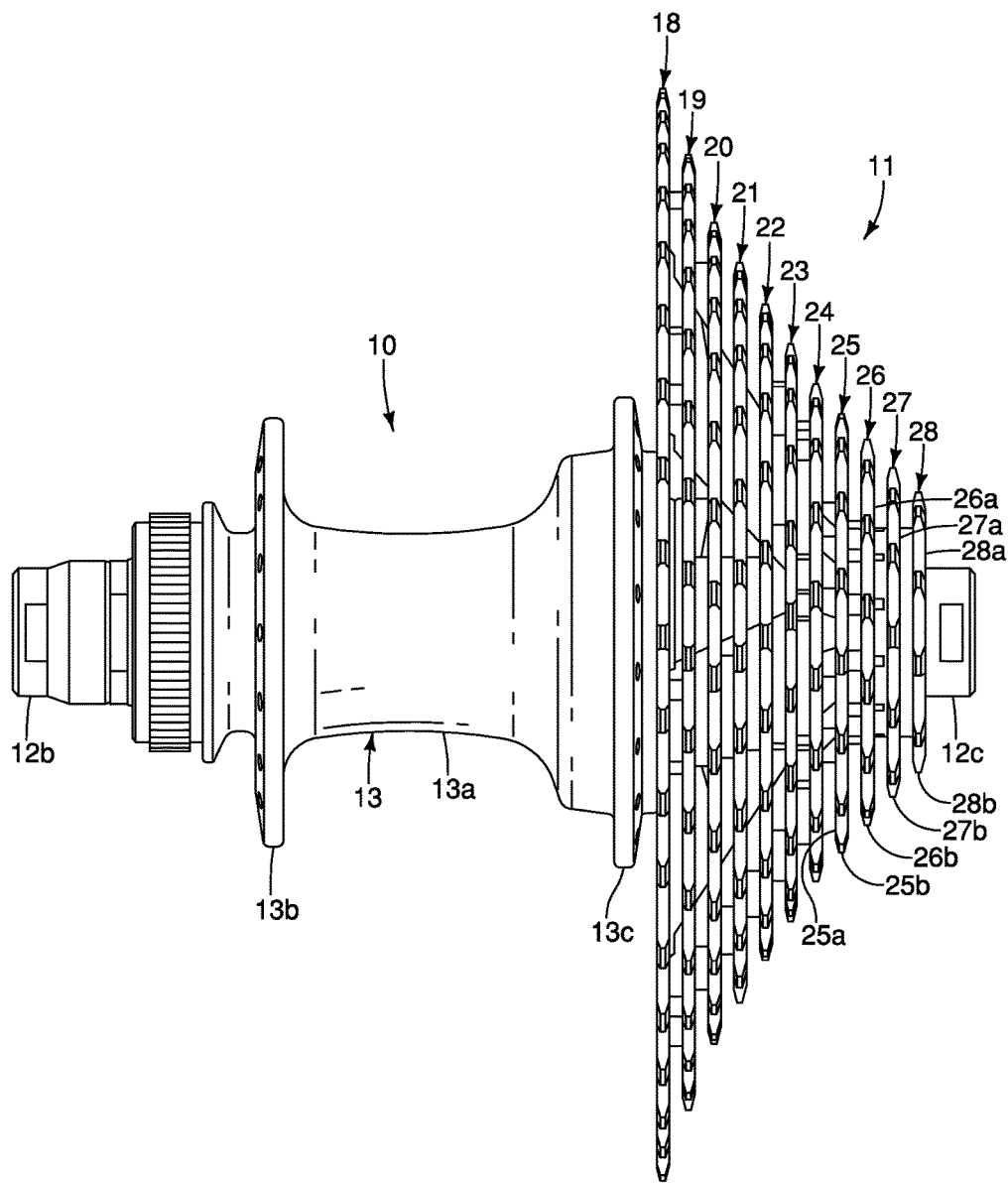
FIG. 2 is a rear elevational view of the rear hub assembly and the rear sprocket assembly of FIG. 1.
Figure 4:
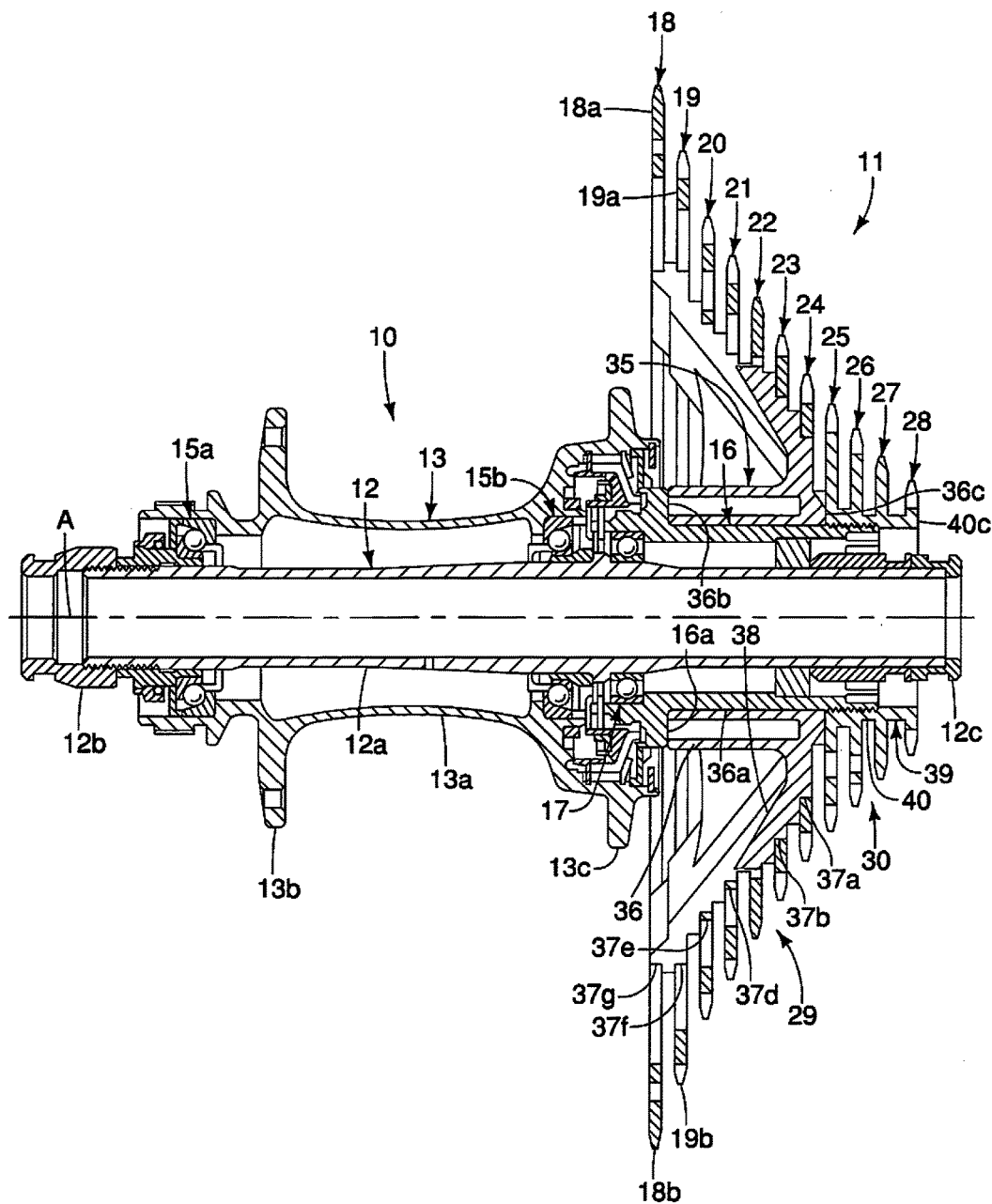
FIG. 4 is a rear elevational view in cross section of the rear hub assembly and the rear sprocket assembly of FIG. 2.

Referring initially to FIGS. 1, 2 and 4, a bicycle rear hub assembly 10 is illustrated to which a bicycle rear sprocket assembly 11 in accordance with a first exemplary embodiment is mounted. The bicycle rear hub assembly 10 basically comprises a hub axle 12 and a hub shell 13. The hub axle 12 is a conventional member having a shaft portion 12a with a first end cap 12b connected to a first end of the hub axle 12 and a second end cap 12c connected to a second end of the hub axle 12. The hub axle 12 defines a rotational center axis A. The hub shell 13 is rotatably mounted on the hub axle 12 to rotate around the center rotational axis A. The hub shell 13 has a center tubular body 13a and a pair of spoke attachment flanges 13b and 13c extending outwardly in a radial direction from the center tubular body 13a.

As shown in FIG. 4, at least one bearing assembly is provided for rotatably supporting the hub shell 13 on the hub axle 12. In the illustrated exemplary embodiment, the hub shell 13 is rotatably mounted on the hub axle 12 by a pair of bearing assemblies 15a and 15b. The bearing assemblies 15a and 15b are conventional parts that are well known in the bicycle field, and thus, the bearing assemblies 15a and 15b will not be discussed or illustrated in detail herein. Also, other bearing arrangements can be used as needed and/or desired.

Referring now to FIG. 4, the bicycle rear hub assembly 10 further comprises a sprocket support body 16. At least one bearing assembly 17 is provided for rotatably supporting the sprocket support body 16 on the hub axle 12. In the illustrated exemplary embodiment, the sprocket support body 16 is rotatably mounted on the hub axle 12 by the bearing assembly 17, although any suitable number of bearing assemblies can be used. Coasting or freewheeling occurs when the sprocket support body 16 stops rotating or moves in a non-driving rotational direction (i.e., counter-clockwise about the rotational center axis A as viewed from the sprocket support body side of the bicycle rear hub assembly 10) while the hub shell 13 rotates in a driving rotational direction (i.e., clockwise about the rotational center axis A as viewed from the sprocket support body side of the bicycle rear hub assembly 10).

Referring to FIGS. 1 to 8, a bicycle rear sprocket assembly 11 is illustrated in accordance with a first exemplary embodiment of the present invention. As shown in FIGS. 1-4 and 6, the bicycle rear sprocket assembly 11 includes eleven sprockets 18 to 28. The sprockets 18 to 28 are axially spaced from each other at predetermined intervals. The sprockets 18 to 28 are configured to be fixedly mounted on the bicycle rear hub assembly 10 such that the sprockets 18 to 28 are configured to rotate together about the rotational center axis A. The sprockets 18 to 28 typically rotate together in a forward rotational direction D (e.g., in a clockwise direction as viewed in FIG. 3) when the rider is pedaling in a forward (clockwise) direction to propel the bicycle in a forward direction. It will be apparent to those skilled in the bicycle art from this disclosure that the rear sprocket assembly can have fewer or more sprockets.

As shown in FIGS. 1 and 2, the sprockets 18 to 28 are hard, rigid disc shaped members formed from a suitable material, such as a metallic material. In the illustrated exemplary embodiment, the sprockets 18 to 28 are each a one-piece, unitary member formed of a metallic material that is suitable for a bicycle sprocket. The sprockets 18 to 28 can include modified teeth, such as teeth having inclined surfaces, and/or recesses to facilitate downshifting and upshifting operations.

Figure 5:
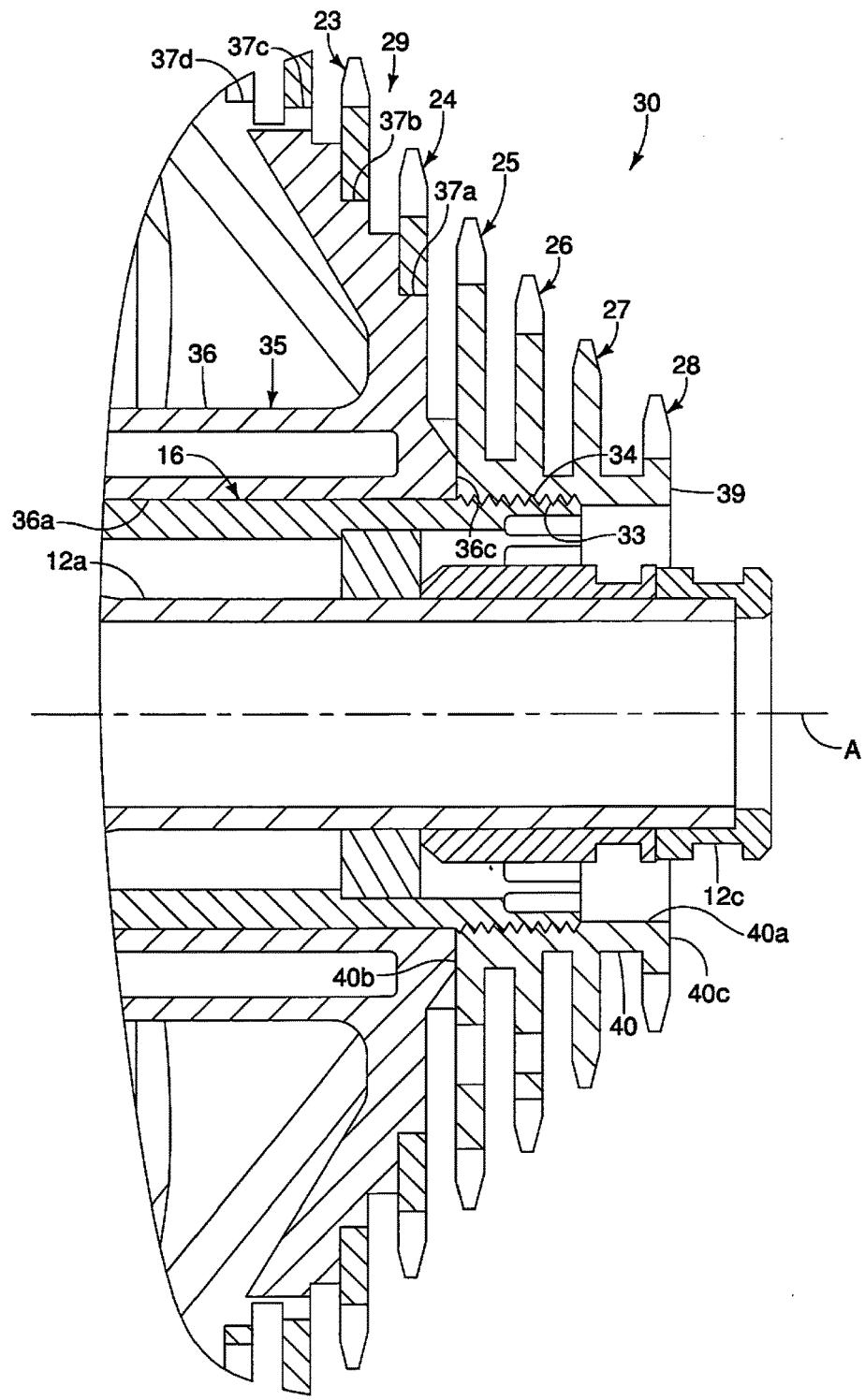
FIG. 5 is an enlarged rear elevational view in cross section of the rear sprocket assembly threadably engaging the rear hub assembly of FIG. 4.
Figure 6:
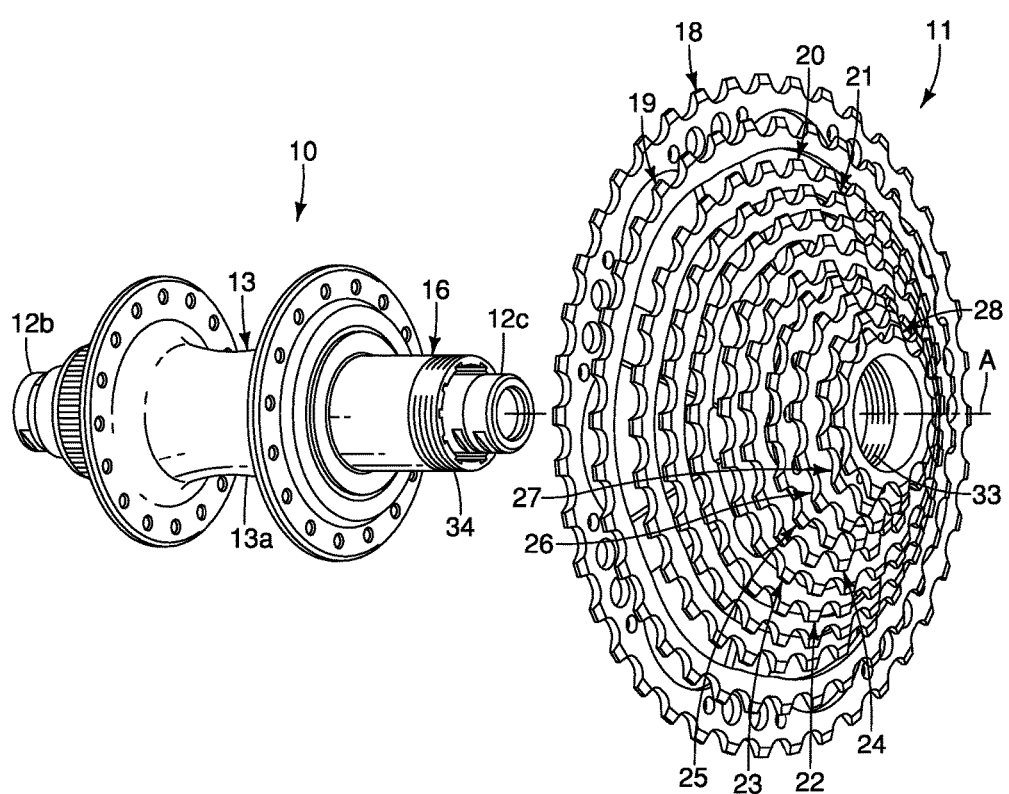
FIG. 6 is an exploded perspective view of the rear hub assembly and the rear sprocket assembly of FIG. 1.
Figure 8:
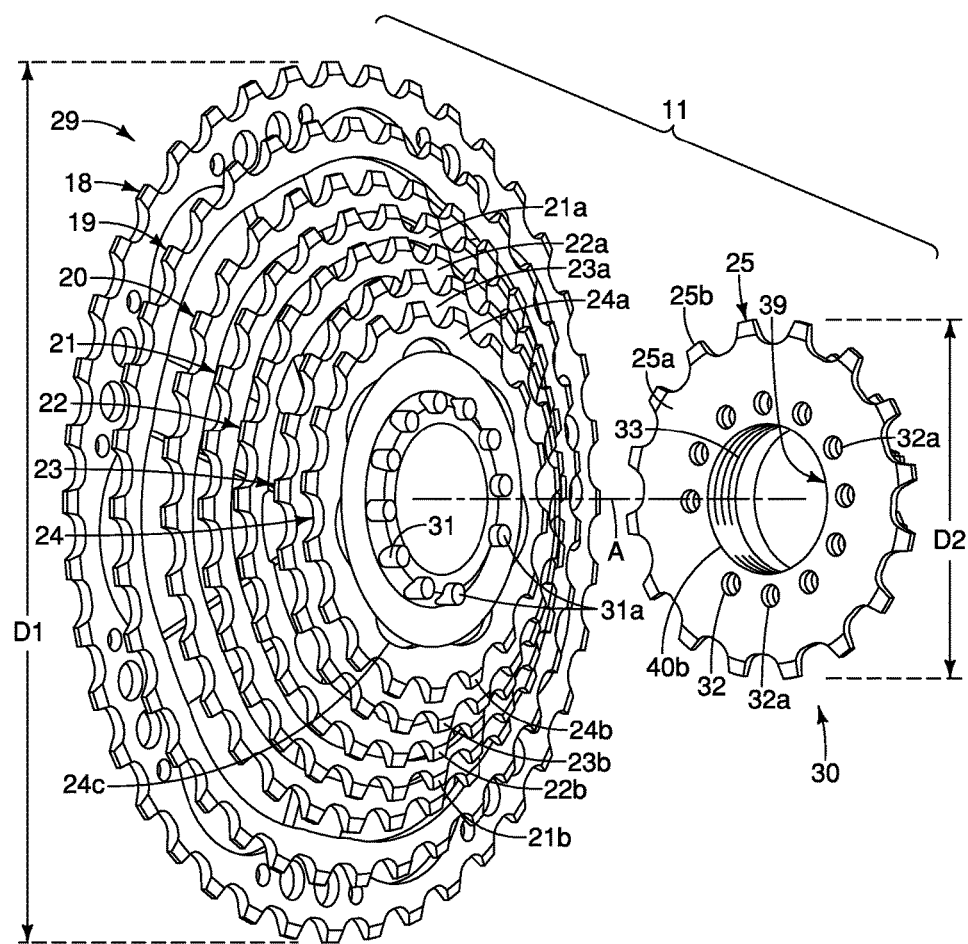
FIG. 8 is an exploded perspective view of the bicycle rear sprocket assembly of FIG. 7.

As shown in FIGS. 4, 5 and 8, the bicycle rear sprocket assembly 11 includes a first sprocket assembly 29 and a second sprocket assembly 30. The first sprocket assembly 29 includes at least one first sprocket, such as sprocket 18, and a first torque transmitting profile 31. The second sprocket assembly 30 includes at least one second sprocket, such as sprocket 25, and a second torque transmitting profile 32. The second torque transmitting profile 32 is configured to engage the first torque transmitting profile 31 to transmit torque between the first sprocket assembly 29 and the second sprocket assembly 30. A threaded portion is provided to one of the first sprocket assembly 29 and the second sprocket assembly 30. The threaded portion is configured to threadably engage a bicycle rear hub assembly 10. As shown in FIG. 5, a threaded portion 33 is provided to the second sprocket assembly 30 that engages a corresponding threaded portion 34 of the sprocket support body 16 of the bicycle rear hub assembly 10.

Figure 10:
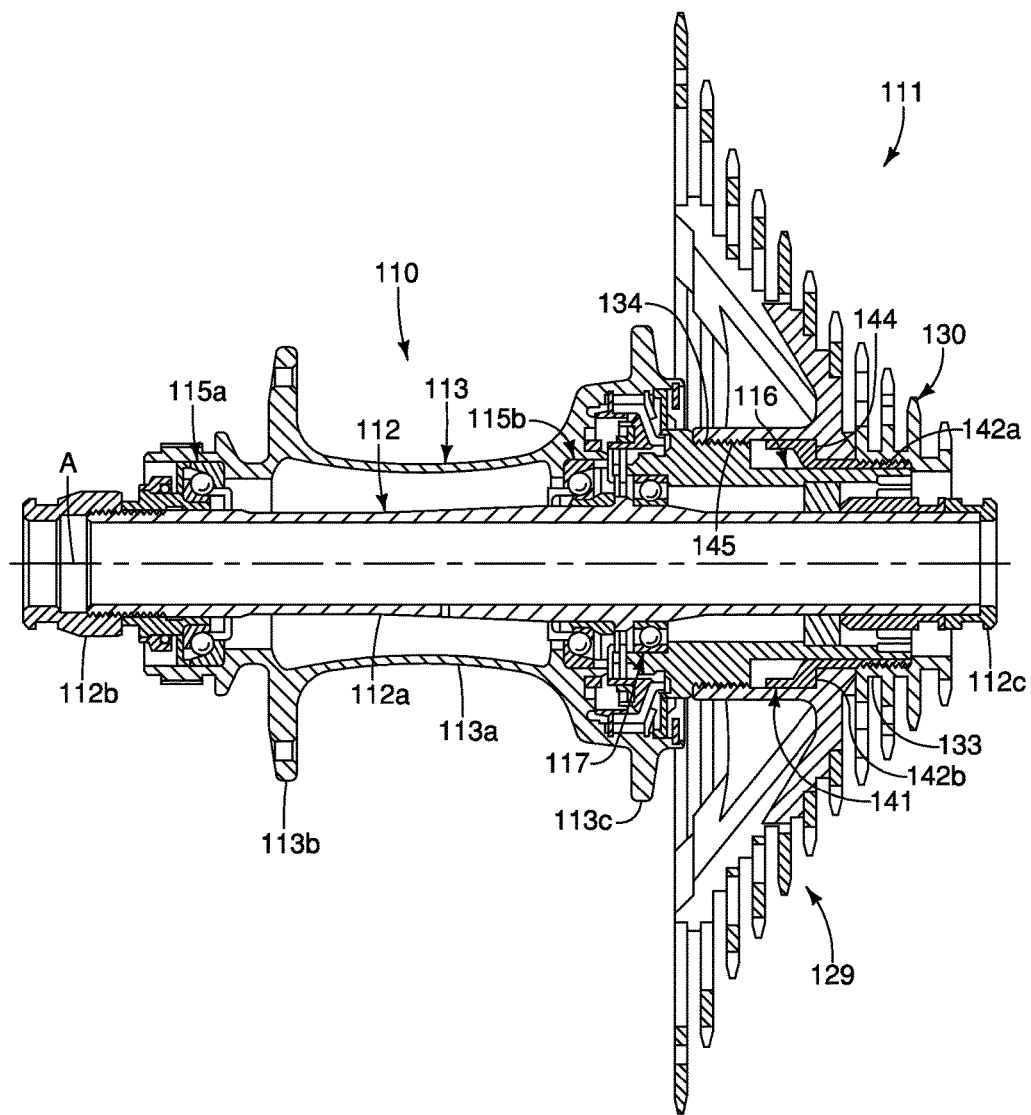
FIG. 10 is a rear elevational view in cross section of the rear sprocket assembly mounted to the rear hub assembly of FIG. 9.
Figure 11:
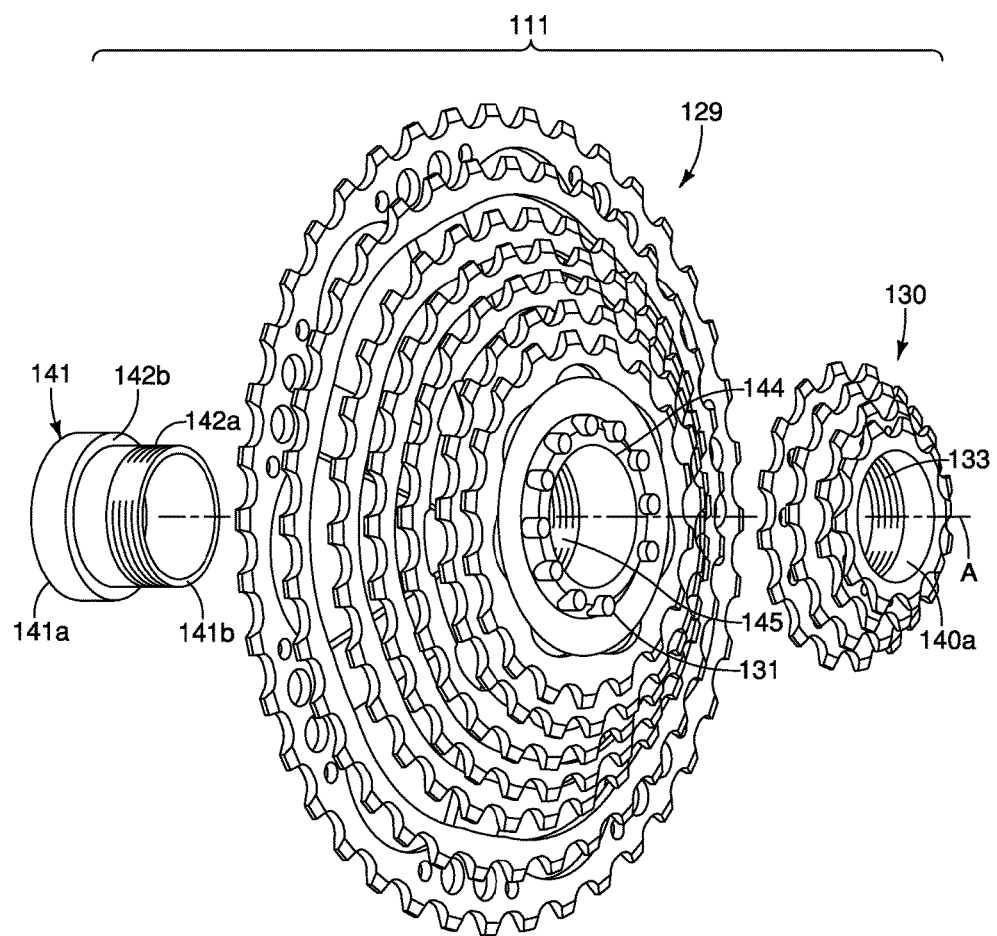
FIG. 11 is an exploded front perspective view of the rear hub assembly of FIG. 9.
Figure 12:
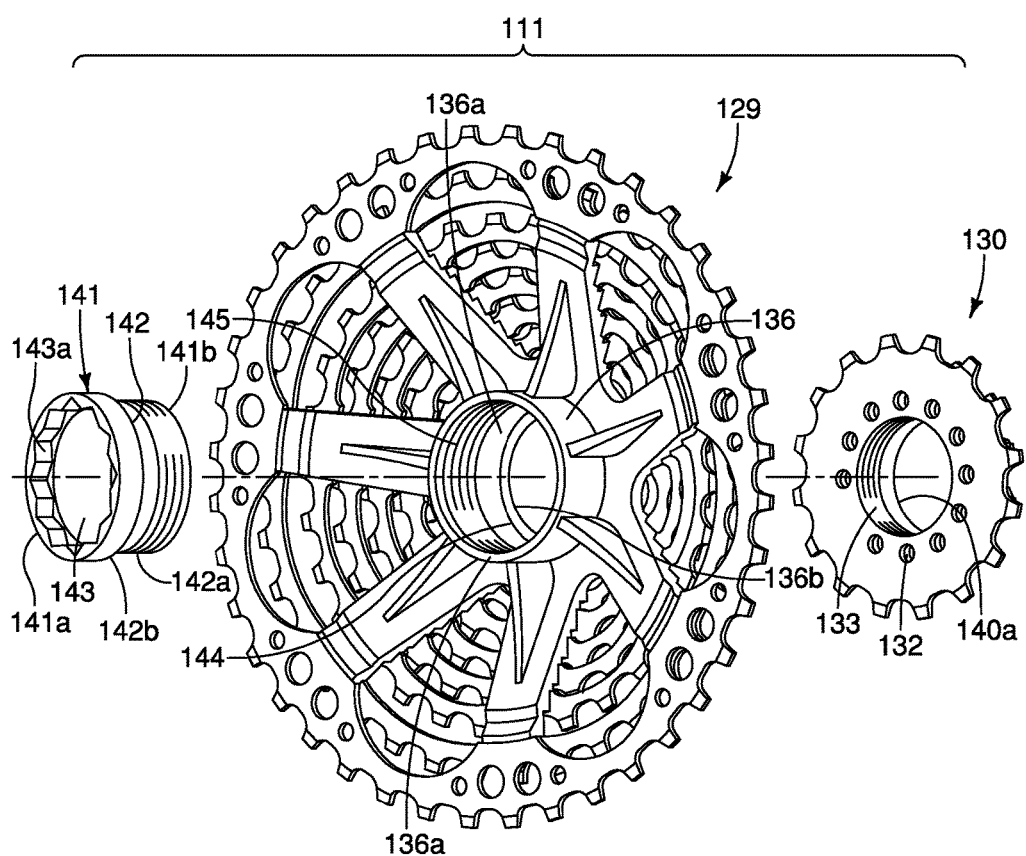
FIG. 12 is an exploded rear perspective view of the rear hub assembly of FIG. 9.

In other words, a first sprocket includes a first torque transmitting profile, and a second sprocket includes a second torque transmitting profile, as shown in FIGS. 8, 11 and 12. The second torque transmitting profile is configured to engage the first torque transmitting profile to transmit torque between the first sprocket and the second sprocket. A threaded portion, such as threaded portion 34 (FIG. 5) and threaded portion 145 (FIG. 10), is provided to one of the first sprocket body and the second sprocket body.

As shown in FIGS. 4, 5 and 8, the first sprocket assembly 29 includes a plurality of first sprockets supported by a first sprocket support member 35. In the illustrated embodiment, the first sprocket assembly 29 includes seven first sprockets, i.e., sprockets 18-24, although the first sprocket assembly 29 can be configured to receive any suitable number of sprockets.

Figure 7:
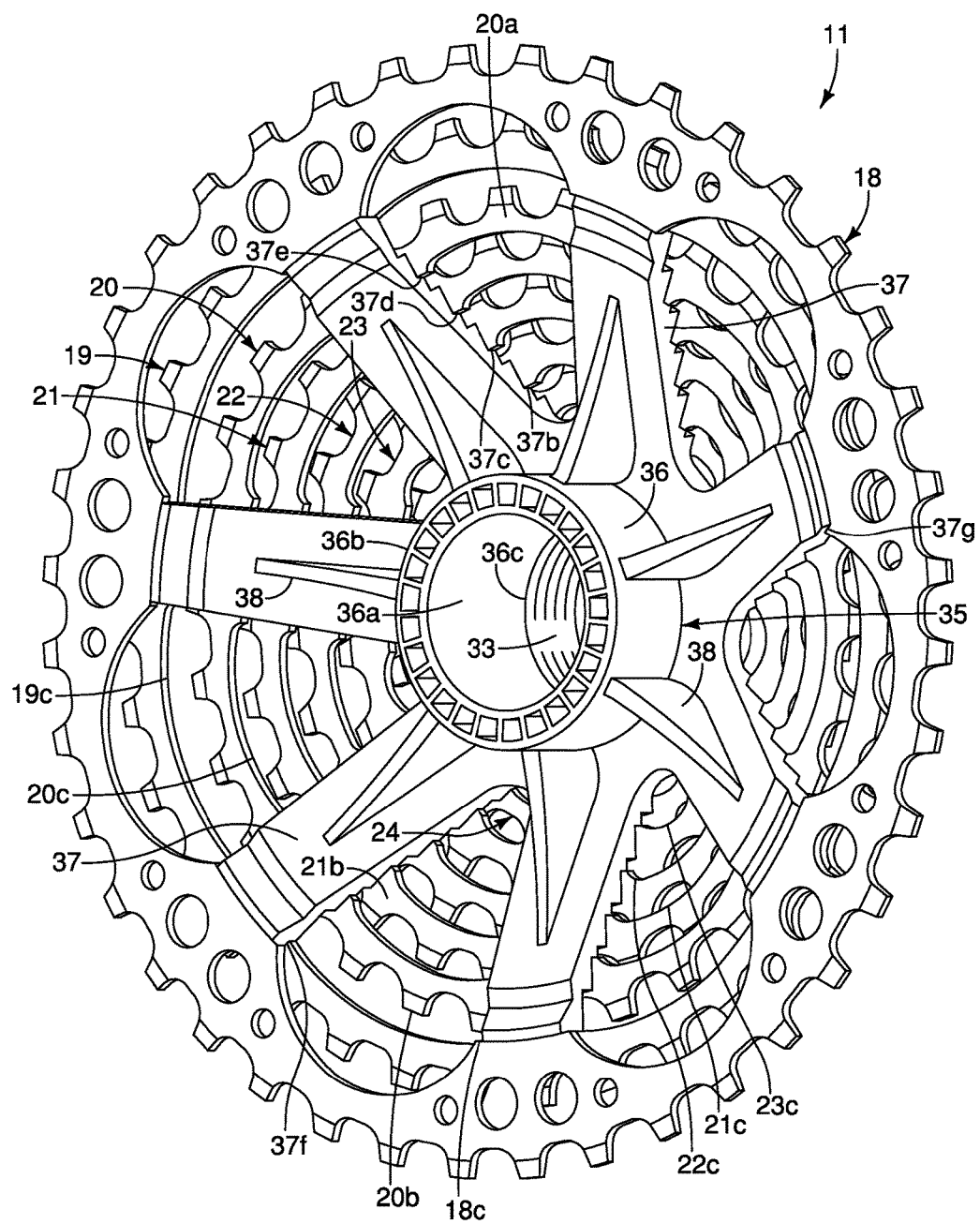
FIG. 7 is a rear perspective view of the rear hub assembly and the rear sprocket assembly of FIG. 6.

The first sprocket support member 35 includes a tubular body 36 and a plurality of support arms 37 extending outwardly in a radial direction from the tubular body 36, as shown in FIGS. 4 and 5. The tubular body 36 has a bore 36a configured to receive the sprocket support body 16. The bore 36a extends from a first end 36b of the tubular body 36 to a second end 36c thereof. A reinforcing member 38 extends between the tubular body 36 and each of the support arms 37, as shown in FIGS. 4 and 7, to strengthen the support arms 37. As shown in FIG. 7, the illustrated embodiment has seven support arms 37, although any suitable number of support arms can be used.

A distal end portion of each of the support arms 37 is disposed closer to the spoke attachment flange 13c than the first end 36b of the tubular body 36 of the first sprocket support member 35 when the first sprocket assembly 29 is received by the sprocket support body 16. As shown in FIGS. 4, 5 and 7, a plurality of shoulders 37a-37g are provided on each support arm 37. Each of the shoulders 37a-37g is configured to receive one of the first sprockets 18-24.

Referring now to FIGS. 4, 7 and 8, the sprocket 18 basically has a sprocket body 18a and a plurality of first sprocket teeth 18b provided to a first outer periphery of the sprocket body 18a. The plurality of teeth 18b are circumferentially spaced and extend radially and outwardly from the first outer periphery of the sprocket body 18a. The sprocket body 18a has a first axial side or small sprocket side that faces the next smaller sprocket (sprocket 19) and a second axial side or large sprocket side that faces the spoke attachment flange 13c. The center of the sprocket 18 is provided with a sprocket attachment portion 18c that is configured to be mounted on the shoulders 37g of the support arms 37 of the first sprocket support member 35 of the bicycle rear sprocket assembly 11 in a conventional manner. As shown in FIGS. 7 and 8, the sprocket attachment portion 18c preferably has a non-circular shape. Preferably, the sprocket 18 is mounted on the arms 37 of the first sprocket support member 35 by diffusion bonding or with an adhesive. Alternatively, a mechanical fastener, such as a rivet, can be used to secure the sprocket 18 to the first sprocket support member 35.

Referring now to FIGS. 4, 7 and 8, the sprocket 19 basically has a sprocket body 19a and a plurality of sprocket teeth 19b provided to an outer periphery of the sprocket body 19a. The plurality of teeth 19b are circumferentially spaced and extend radially and outwardly from the outer periphery of the sprocket body 19a. The sprocket body 19a has a first axial side or small sprocket side that faces the next smaller sprocket (sprocket 20) and a second axial side or large sprocket side that faces the next larger sprocket (sprocket 18). The Center of the sprocket 19 is provided with a sprocket attachment portion 19c that is configured to be mounted on the shoulders 37f of the support arms 37 of the first sprocket support member 35 of the bicycle rear sprocket assembly 11 in a conventional manner. As shown in FIGS. 7 and 8, the sprocket attachment portion 19c preferably has a non-circular shape. Preferably, the sprocket 19 is mounted on the arms 37 of the first sprocket support member 35 by diffusion bonding or with an adhesive. Alternatively, a mechanical fastener, such as a rivet, can be used to secure the sprocket 19 to the first sprocket support member 35.

Referring now to FIGS. 4, 7 and 8, the sprocket 20 basically has a sprocket body 20a and a plurality of circumferentially spaced teeth 20b extending radially and outwardly from an outer periphery of the sprocket body 20a. The sprocket body 20a has a first axial side or small sprocket side that faces the next smaller sprocket (sprocket 21) and a second axial side or large sprocket side that faces the next larger sprocket (sprocket 19). The center of the sprocket 20 is provided with a sprocket attachment portion 20c that is configured to be mounted on the shoulders 37e of the support arms 37 of the first sprocket support member 35 of the bicycle rear sprocket assembly 11 in a conventional manner. As shown in FIGS. 7 and 8, the sprocket attachment portion 20c preferably has a non-circular shape. Preferably, the sprocket 20 is mounted on the arms 37 of the first sprocket support member 35 by diffusion bonding or with an adhesive. Alternatively, a mechanical fastener, such as a rivet, can be used to secure the sprocket 20 to the first sprocket support member 35.

Referring now to FIGS. 4, 7 and 8, the sprocket 21 basically has a sprocket body 21a and a plurality of circumferentially spaced teeth 21b extending radially and outwardly from an outer periphery of the sprocket body 21a. The sprocket body 21a has a first axial side or small sprocket side that faces the next smaller sprocket (sprocket 22) and a second axial side or large sprocket side that faces the next larger sprocket (sprocket 20). The center of the sprocket 21 is provided with a sprocket attachment portion 21c that is configured to be mounted on the shoulders 37d of the support arms 37 of the first sprocket support member 35 of the bicycle rear sprocket assembly 11 in a conventional manner. As shown in FIGS. 7 and 8, the sprocket attachment portion 21c preferably has a non-circular shape. Preferably, the sprocket 21 is mounted on the arms 37 of the first sprocket support member 35 by diffusion bonding or with an adhesive. Alternatively, a mechanical fastener, such as a rivet, can be used to secure the sprocket 21 to the first sprocket support member 35.

Referring now to FIGS. 4, 7 and 8, the sprocket 22 basically has a sprocket body 22a and a plurality of circumferentially spaced teeth 22b extending radially and outwardly from an outer periphery of the sprocket body 22a. The sprocket body 22a has a first axial side or small sprocket side that faces the next smaller sprocket (sprocket 23) and a second axial side or large sprocket side that faces the next larger sprocket (sprocket 21). The center of the sprocket 22 is provided with a sprocket attachment portion 22c that is configured to be mounted on the shoulders 37c of the support arms 37 of the first sprocket support member 35 of the bicycle rear sprocket assembly 11 in a conventional manner. As shown in FIGS. 7 and 8, the sprocket attachment portion 22c preferably has a non-circular shape. Preferably, the sprocket 22 is mounted on the arms 37 of the first sprocket support member 35 by diffusion bonding or with an adhesive. Alternatively, a mechanical fastener, such as a rivet, can be used to secure the sprocket 22 to the first sprocket support member 35.

Referring now to FIGS. 4, 7 and 8, the sprocket 23 basically has a sprocket body 23a and a plurality of circumferentially spaced teeth 23b extending radially and outwardly from an outer periphery of the sprocket body 23a.

The sprocket body 23a has a first axial side or small sprocket side that faces the next smaller sprocket (sprocket 24) and a second axial side or large sprocket side that faces the next larger sprocket (sprocket 22). The center of the sprocket 23 is provided with a sprocket attachment portion 23c that is configured to be mounted on the shoulders 37b of the support arms 37 of the first sprocket support member 35 of the bicycle rear sprocket assembly 11 in a conventional manner. As shown in FIGS. 7 and 8, the sprocket attachment portion 23c preferably has a non-circular shape. Preferably, the sprocket 23 is mounted on the arms 37 of the first sprocket support member 35 by diffusion bonding or with an adhesive. Alternatively, a mechanical fastener, such as a rivet, can be used to secure the sprocket 23 to the first sprocket support member 35.

Referring now to FIGS. 4, 7 and 8, the sprocket 24 basically has a sprocket body 24a and a plurality of circumferentially spaced teeth 24b extending radially and outwardly from an outer periphery of the sprocket body 24a. The sprocket body 24a has a first axial side or small sprocket side that faces the next smaller sprocket (sprocket 25) and a second axial side or large sprocket side that faces the next larger sprocket (sprocket 23). The center of the sprocket 24 is provided with a sprocket attachment portion 24c that is configured to be mounted on the shoulders 37a of the support arms 37 of the first sprocket support member 35 of the bicycle rear sprocket assembly 11 in a conventional manner. As shown in FIGS. 7 and 8, the sprocket attachment portion 24c preferably has a non-circular shape. Preferably, the sprocket 24 is mounted on the arms 37 of the first sprocket support member 35 by diffusion bonding or with an adhesive. Alternatively, a mechanical fastener, such as a rivet, can be used to secure the sprocket 24 to the first sprocket support member 35.

As shown in FIGS. 4, 5 and 8, the second sprocket assembly 30 includes a plurality of second sprockets supported by a second sprocket support member 39. In the illustrated embodiment, the second sprocket assembly 30 includes four second sprockets, i.e., sprockets 25-28, although the second sprocket assembly 30 can include any suitable number of sprockets.

The second sprocket support member 39 includes a tubular body 40 having a bore 40a extending from a first end 40b to a second end 40c, as shown in FIGS. 4, 5 and 8. The bore 40a is configured to receive the sprocket support body 16. The threaded portion 33 is provided to a portion of the bore 40a. The second sprockets, e.g., sprockets 25-28, are preferably integrally formed with the tubular body 40, such that the second sprocket assembly 30 is formed as a one-piece member. Alternatively, the second sprocket support member 39 can be configured substantially similarly as the first sprocket support member 35 such that each of the second sprockets is separately formed and attached to the second sprocket support member.

Referring now to FIGS. 2 and 8, the sprocket 25 basically has a sprocket body 25a and a plurality of sprocket teeth 25b provided to an outer periphery of the sprocket body 25a. The plurality of sprocket teeth 25b are circumferentially spaced and extend radially and outwardly from an outer periphery of the sprocket body 25a. The sprocket body 25a has a first axial side or small sprocket side that faces the next smaller sprocket (sprocket 26) and a second axial side or large sprocket side that faces the next larger sprocket (sprocket 24).

Figure 3:
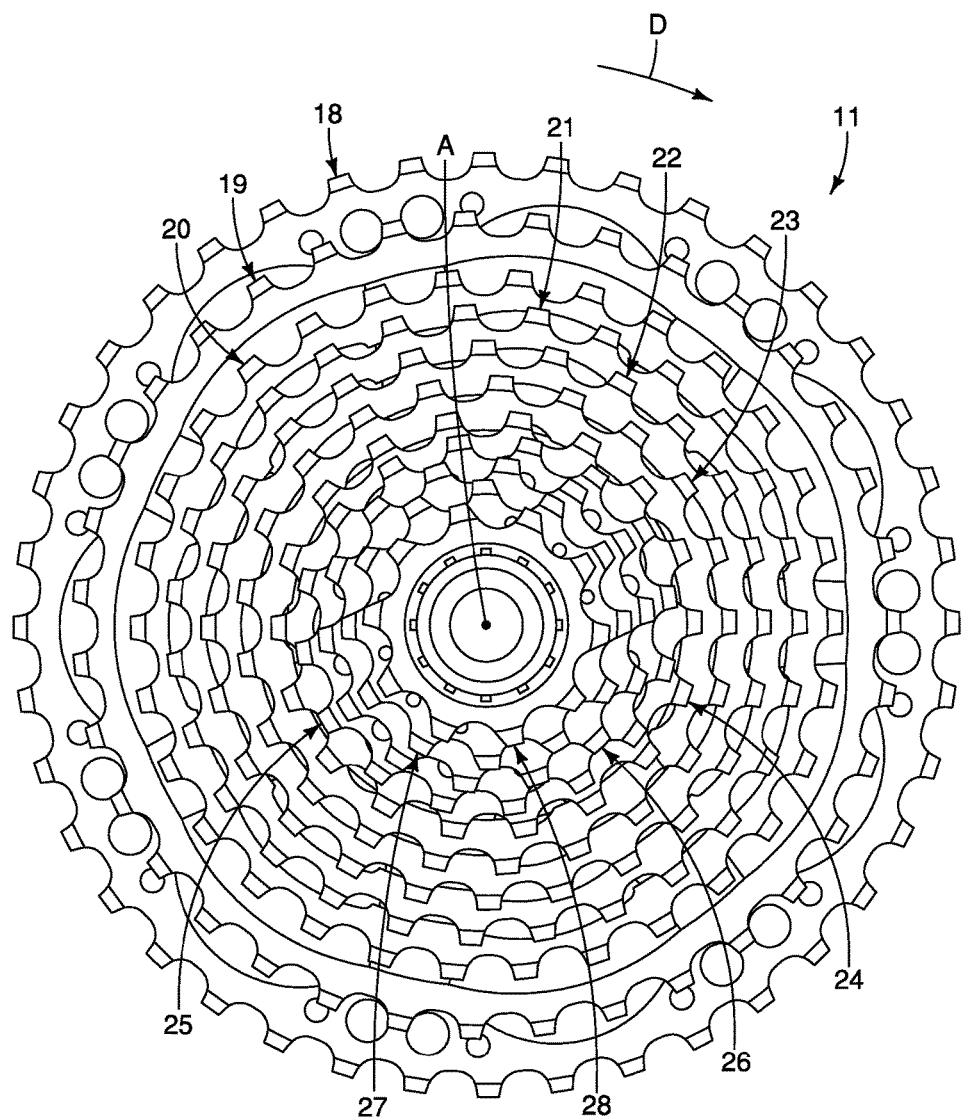
FIG. 3 is a side elevational view of the rear hub assembly and the rear sprocket assembly of FIG. 1.

Referring now to FIGS. 2 and 3, the sprocket 26 basically has a sprocket body 26a and a plurality of circumferentially spaced teeth 26b extending radially and outwardly from an outer periphery of the sprocket body 26a. The sprocket body 26a has a first axial side or small sprocket side that faces the next smaller sprocket (sprocket 27) and a second axial side or large sprocket side that faces the next larger sprocket (sprocket 25).

Referring now to FIGS. 2 and 3, the sprocket 27 basically has a sprocket body 27a and a plurality of circumferentially spaced teeth 27b extending radially and outwardly from an outer periphery of the sprocket body 27a. The sprocket body 27a has a first axial side or small sprocket side that faces the next smaller sprocket (sprocket 28) and a second axial side or large sprocket side that faces the next larger sprocket (sprocket 26).

Referring now to FIGS. 2 and 3, the sprocket 28 basically has a sprocket body 28a and a plurality of circumferentially spaced teeth 28b extending radially and outwardly from an outer periphery of the sprocket body 28a. The sprocket body 28a has a first axial side or small sprocket side that faces in an outbound direction of the bicycle (e.g., toward the second end cap 12c) and a second axial side or large sprocket side that faces the next larger sprocket (sprocket 27).

Referring to FIG. 8, the at least one first sprocket (e.g., sprocket 18) has a first sprocket diameter D1, and the at least one second sprocket (e.g., sprocket 25) has a second sprocket diameter D2. The second sprocket diameter D2 is smaller than the first sprocket diameter D1. As shown in FIGS. 2 to 4, the sprockets 18-28 have decreasing diameters moving in the outbound direction (e.g., away from the spoke attachment flange 13c) from sprocket 18 to sprocket 28.

Referring to FIGS. 4 and 5, the first sprocket assembly 29 is connected to the bicycle rear hub assembly 10 such that the first sprocket support member 35 receives the sprocket support body 16. The first end 36b of the tubular body 36 abuts a shoulder 16a of the sprocket support body 16, thereby properly positioning the first sprocket assembly 29. The second sprocket assembly 30 is connected to the bicycle rear hub assembly 10 such that the tubular body 40 of the second sprocket support member 39 receives the sprocket support body 16. The first end 40b of the tubular body 40 of the second sprocket support member 39 abuts the second end 36c of the tubular body 36 of the first sprocket support member 35. The threaded portion 34 of the second sprocket support member 39 of the second sprocket assembly 30 threadably engages the threaded portion 33 of the sprocket support body 16, thereby securing the bicycle rear sprocket assembly 11 to the bicycle rear hub assembly 10.

Referring to FIG. 8, the first torque transmitting profile 31 includes at least one projection 31a extending axially outwardly from the second end 36c of the tubular body 36 of the first sprocket support member 35. Preferably, the at least one projection 31a includes a plurality of projections. The illustrated exemplary embodiment has eleven projections 31a, although any suitable number of projections can be used. The projections 31a extend in an axial direction substantially parallel to the rotational center axis A. The plurality of projections 31a are circumferentially spaced on the first torque transmitting profile 31.

The second torque transmitting profile 32 includes at least one recess 32a configured to receive the at least one projection 31a. Preferably, the at least one recess 32a includes a plurality of recesses. The illustrated exemplary embodiment has eleven recesses 32a, although any suitable number of recesses can be used. Preferably, there are an equal number of projections 31a and recesses 32a. The recesses extend in the axial direction substantially parallel to the rotational center axis A. The plurality of recesses 32a are circumferentially spaced on the second torque transmitting profile 32. Alternatively, the at least one projection 31a of the first torque transmitting profile 31 can be provided to the second sprocket assembly 30, and the at least one recess 32a of the second torque transmitting profile 32 can be provided to the first sprocket assembly 29. Accordingly, one of the first torque transmitting profile 31 and the second torque transmitting profile 32 includes at least one projection 31a, and the other of the first torque transmitting profile 31 and the second torque transmitting profile 32 includes at least one recess 32a configured to receive the at least one projection 31a.

When the first end 40b of the tubular body 40 of the second sprocket support member 39 abuts the second end 36c of the tubular body 36 of the first sprocket support member 35, the second torque transmitting profile 32 engages the first torque transmitting profile 31 such that torque is transmitted between the first sprocket assembly 29 and the second sprocket assembly 30. Each of the plurality of recesses 32a receives one of the plurality of projections 31a, thereby allowing for torque to be transmitted between the first sprocket assembly 29 and the second sprocket assembly 30. With such a configuration, the bicycle rear sprocket assembly 11 can be mounted to the bicycle rear hub assembly 10 without forming splines.

As shown in FIGS. 9 to 12, a bicycle rear sprocket assembly 111 in accordance with another illustrated exemplary embodiment of the present invention is substantially similar to the bicycle rear sprocket assembly 11 of the exemplary embodiment illustrated in FIGS. 1 to 8 except for the differences described below. Similar parts are identified with similar reference numerals, except increased by 100 (i.e., 1xx, accordingly).

In the illustrated exemplary embodiment shown in FIGS. 9 to 12, one of the first sprocket assembly 129 and the second sprocket assembly 130 has a first threaded part 133, and a connecting member 141 includes a second threaded part 142a configured to threadably engage the first threaded part 133. The second sprocket assembly 130 includes the first threaded part 133 disposed on a portion of the bore 140a. Alternatively, the first threaded part 133 can be provided to the first sprocket assembly 129. A threaded portion 145 is provided to the first sprocket assembly 129 to threadably engage the threaded portion 134 of the rear hub assembly 110.

Referring to FIGS. 10 to 12, the connecting member 141 is configured to connect the first sprocket assembly 129 and the second sprocket assembly 130. The connecting member 141 has an outer surface 142 extending from a first end 141a to a second end 141b. The second threaded part 142a is disposed on the outer surface 142 of the connecting member 141. An inner surface 143 extends from the first end 141a to the second end 141b of the connecting member 141. The connecting member 141 includes a tool engaging profile 143a to facilitate connecting the first sprocket assembly 129 and the second sprocket assembly 130 using a tool. The tool engaging profile 143a is disposed on the inner surface 143 of the connecting member 141.

The other of the first sprocket assembly 129 and the second sprocket assembly 130 has a first axial abutment surface 144. The first axial abutment surface 144 is disposed on either the first sprocket assembly 129 or the second sprocket assembly 130, whichever is not provided with the first threaded part 133. The first axial abutment surface 144 is provided to the first sprocket assembly 129, as shown in FIG. 10, and the first threaded part 133 is provided to the second sprocket assembly 130. The first axial abutment surface 144 is disposed on an inner surface of the tubular body 136 of the first sprocket assembly 129 between the first end 136a and the second end 136b. The connecting member 141 includes a second axial abutment surface 142b configured to contact the first axial abutment surface 144, as shown in FIGS. 10 to 12. The second axial abutment surface 142b is formed on the outer surface 142 of the connecting member 141 between the first end 141a and the second end 141b.

The first sprocket assembly 129 is disposed on the connecting member 141 such that the first axial abutment surface 144 of the first sprocket assembly 129 abuts the second axial abutment surface 142b of the connecting member 141. The second sprocket assembly 130 is then disposed on the connecting member 141 such that the second torque transmitting profile 132 engages the first torque transmitting profile 131 of the first sprocket assembly 129. Accordingly, torque can be transmitted between the first sprocket assembly 129 and the second sprocket assembly 130 through the engaged first torque transmitting profile 131 and the second torque transmitting profile 132.

Figure 9:
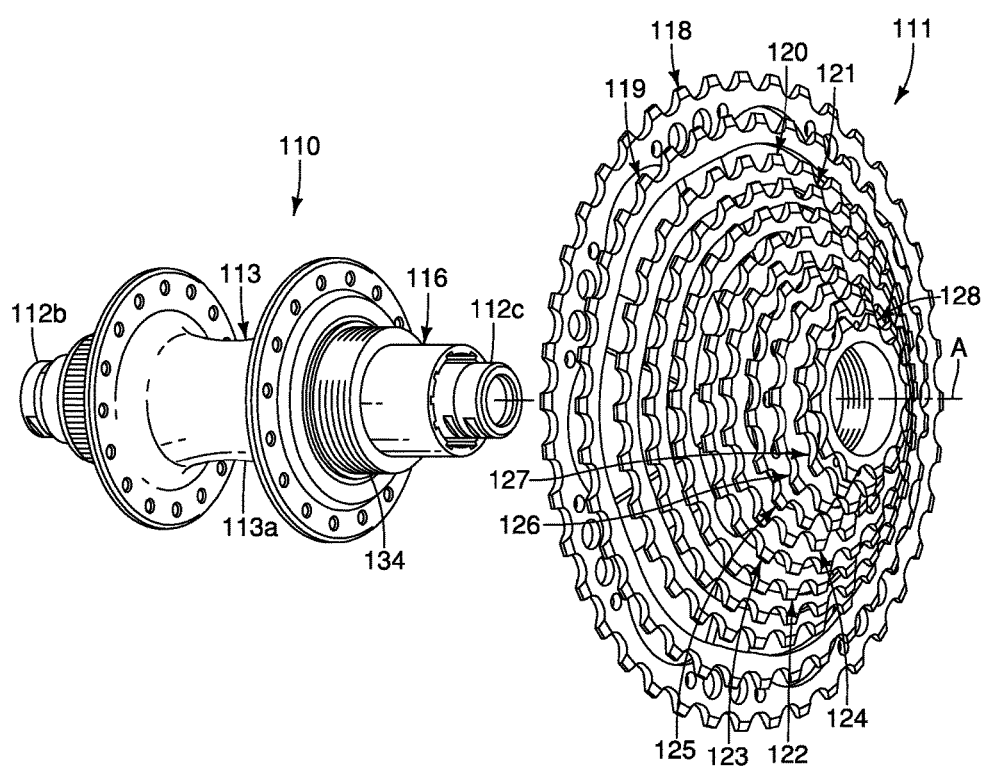
FIG. 9 is an exploded perspective view of a bicycle rear hub assembly and a bicycle rear sprocket assembly in accordance with another illustrated embodiment of the present invention.

A tool engages the tool engaging profile 143a of the connecting member 141 to threadably engage the second threaded part 142a of the connecting member 141 with the first threaded part 133 of the second sprocket assembly 130, thereby connecting the first sprocket assembly 129 and the second sprocket assembly 130 and forming the bicycle rear sprocket assembly 111. Accordingly, the rear sprocket assembly 111 is assembled prior to being mounted on the rear hub assembly 110, as shown in FIG. 9.

As shown in FIG. 10, the bicycle rear sprocket assembly 111 is secured to the rear hub assembly 110 such that a threaded portion 145 of the first sprocket assembly 129 threadably engages the threaded portion 134 of the sprocket support body 116, as shown in FIG. 10, thereby connecting the rear sprocket assembly 111 and the rear hub assembly 110. With such a configuration, the bicycle rear sprocket assembly 111 can be mounted to the bicycle rear hub assembly 110 without forming splines.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle rear sprocket assembly. Accordingly, these directional terms, as utilized to describe the bicycle rear sprocket assembly should be interpreted relative to a bicycle in an upright riding position on a horizontal surface and that is equipped with the bicycle rear sprocket assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:
1. A bicycle rear sprocket assembly comprising:
   a first sprocket assembly including
      at least one first sprocket; and
      a first torque transmitting profile; and
   a second sprocket assembly including
      at least one second sprocket; and
      a second torque transmitting profile configured to engage the first torque transmitting profile to transmit torque between the first sprocket assembly and the second sprocket assembly; and
   a threaded portion provided to the first sprocket assembly, the threaded portion being configured to threadedly engage a bicycle rear hub assembly, the second sprocket assembly being not provided with the threaded portion and being free of a spline for engaging the bicycle rear hub assembly.
2. The bicycle rear sprocket assembly according to claim 1, wherein
   the at least one first sprocket includes a plurality of first sprockets.
3. The bicycle rear sprocket assembly according to claim 2, wherein
   the at least one second sprocket includes a plurality of second sprockets.
4. The bicycle rear sprocket assembly according to claim 1, wherein
   one of the first torque transmitting profile and the second torque transmitting profile includes at least one projection,
   the other of the first torque transmitting profile and the second torque transmitting profile includes at least one recess configured to receive the at least one projection.
5. The bicycle rear sprocket assembly according to claim 4, wherein
   the at least one projection extends in an axial direction parallel to a rotational center axis of the bicycle rear sprocket assembly, and
   the at least one recess extends in the axial direction.
6. The bicycle rear sprocket assembly according to claim 4, wherein
   the at least one projection includes a plurality of projections, and
   the at least one recess includes a plurality of recesses.
7. The bicycle rear sprocket assembly according to claim 6, wherein
   the plurality of projections are circumferentially spaced on the one of the first torque transmitting profile and the second torque transmitting profile, and
   the plurality of recesses are circumferentially spaced on the other of the first torque transmitting profile and the second torque transmitting profile.
8. The bicycle rear sprocket assembly according to claim 1, further comprising
   a connecting member configured to connect the first sprocket assembly and the second sprocket assembly.
9. The bicycle rear sprocket assembly according to claim 8, wherein
   the connecting member includes a tool engaging profile.
10. The bicycle rear sprocket assembly according to claim 9, wherein
   the tool engaging profile is disposed on an inner surface of the connecting member.
11. The bicycle rear sprocket assembly according to claim 8, wherein
   one of the first sprocket assembly and the second sprocket assembly has a first threaded part, and
   the connecting member includes a second threaded part configured to threadedly engage the first threaded part.
12. The bicycle rear sprocket assembly according to claim 11, wherein
   the second threaded part is disposed on an outer surface of the connecting member.
13. The bicycle rear sprocket assembly according to claim 11, wherein
   the other of the first sprocket assembly and the second sprocket assembly has a first axial abutment surface, and
   the connecting member includes a second axial abutment surface configured to contact the first axial abutment surface.
14. The bicycle rear sprocket assembly according to claim 1, wherein
   the at least one first sprocket has a first sprocket diameter, and the at least one second sprocket has a second sprocket diameter that is smaller than the first sprocket diameter.

15. A bicycle rear sprocket assembly comprising:
a first sprocket including
   a first sprocket body;
   a plurality of first sprocket teeth provided to a first outer periphery of the first sprocket body; and
   a first torque transmitting profile, the first torque transmitting profile being disposed radially closer to a radially innermost surface of the first sprocket body than to a radially outermost surface of the first sprocket body; and
a second sprocket including
   a second sprocket body;
   a plurality of second sprocket teeth provided to a second outer periphery of the second sprocket body; and
   a second torque transmitting profile configured to engage the first torque transmitting profile to transmit torque between the first sprocket and the second sprocket, the second torque transmitting profile being disposed radially closer to a radially innermost surface of the second sprocket body than to a radially outermost surface of the second sprocket body; and
a threaded portion provided to the first sprocket body.

16. The bicycle rear sprocket assembly according to claim 15, wherein
one of the first torque transmitting profile and the second torque transmitting profile includes at least one projection, and
the other of the first torque transmitting profile and the second torque transmitting profile includes at least one recess configured to receive the at least one projection.

17. The bicycle rear sprocket assembly according to claim 16, wherein
the at least one projection extends in an axial direction parallel to a rotational center axis of the bicycle rear sprocket assembly, and
the at least one recess extends in the axial direction.

18. The bicycle rear sprocket assembly according to claim 16, wherein
the at least one projection includes a plurality of projections, and
the at least one recess includes a plurality of recesses.

19. The bicycle rear sprocket assembly according to claim 18, wherein
the plurality of projections are circumferentially spaced on the one of the first torque transmitting profile and the second torque transmitting profile, and
the plurality of recesses are circumferentially spaced on the other of the first torque transmitting profile and the second torque transmitting profile.

* * * * *